US007249513B1

(12) United States Patent
Zipparo et al.

(10) Patent No.: US 7,249,513 B1
(45) Date of Patent: Jul. 31, 2007

(54) ULTRASOUND PROBE

(75) Inventors: Michael J. Zipparo, Parker, CO (US); Monica P. Johnson, Centennial, CO (US)

(73) Assignee: Gore Enterprise Holdings, Inc., Newark, DE (US)

(*) Notice: Subject to any disclaimer, the term of this patent is extended or adjusted under 35 U.S.C. 154(b) by 40 days.

(21) Appl. No.: 10/678,483

(22) Filed: Oct. 2, 2003

(51) Int. Cl.
*G01N 29/24* (2006.01)

(52) U.S. Cl. .......................... 73/625; 73/628; 310/336

(58) Field of Classification Search .......... 73/625–629, 73/632; 367/152, 155, 162, 176; 310/334, 310/336; 600/459, 463
See application file for complete search history.

(56) References Cited

U.S. PATENT DOCUMENTS 4,217,684 A 8/1980 Brisken et al. ............ 29/25.35
4,676,106 A * 6/1987 Nagai et al. .................. 73/625
5,091,893 A * 2/1992 Smith et al. ................ 367/153
5,267,221 A * 11/1993 Miller et al. ................ 367/140
5,329,498 A 7/1994 Greenstein .................. 367/155
5,398,689 A * 3/1995 Connor et al. .............. 600/459
5,648,942 A 7/1997 Kunkel, III ................. 367/176
5,795,299 A 8/1998 Eaton et al. ................ 600/459
5,797,848 A * 8/1998 Marian et al. .............. 600/459
5,920,972 A * 7/1999 Palczewska et al. ....... 29/25.35
6,100,626 A 8/2000 Frey et al. .................. 310/334
6,117,083 A * 9/2000 Buck et al. ................. 600/459
6,153,967 A 11/2000 Kobayashi et al. .......... 310/334
6,266,857 B1 7/2001 Corbett, III et al. ....... 29/25.35
6,467,138 B1 10/2002 Aime ........................ 29/25.35
6,511,433 B1* 1/2003 Benjamin ................... 600/463
6,514,618 B1 2/2003 McKeighen ................ 428/413
6,541,896 B1 4/2003 Piel, Jr. et al. ............. 310/334
6,546,803 B1* 4/2003 Ptchelintsev et al. ......... 73/625
6,559,389 B1 5/2003 Kornrumpf et al. ........ 174/254
2006/0119222 A1 6/2006 Sato ........................... 310/334

FOREIGN PATENT DOCUMENTS

JP 63146699 12/1986

(Continued)

OTHER PUBLICATIONS

Buhrdorf, A. et al; Capacitive Micromachined Ultrasonic Transducers and Their Application; 2001 IEEE Ultrasonic Symposium-933.

(Continued)

*Primary Examiner*—Hezron Williams
*Assistant Examiner*—Nashmiya Fayyaz
(74) *Attorney, Agent, or Firm*—Marsh Fischmann & Breyfogle LLP

(57) ABSTRACT

An improved ultrasound probe includes a support member, a signal cable having a plurality of electrically conductive members and an ultrasound transducer array. Distal end portions of each of the conductive members may be separately embodied within and extend through the support member to a first side thereof. In turn, the ultrasound transducer array may be supportably mounted to the first side of the support member, wherein transducer elements comprising the ultrasound transducer array are electrically interconnected to different ones of the electrically conductive members. The support member preferably includes an acoustic dampening material. In one embodiment, the ultrasound transducer array may be defined by a piezoelectric layer having electrically conductive signal and ground layers on opposing sides thereof.

36 Claims, 5 Drawing Sheets

FOREIGN PATENT DOCUMENTS

JP 2002095090 A * 3/2002

OTHER PUBLICATIONS

Noble, R.A., et al; A Cost-effective and Manufacturable Route to the Fabrication of High Density 2D Micromachined Ultrasonic Transducer Arrays and (CMOS) Signal Conditioning Electronics on the Same Silicon Substrate; 2001 IEEE Ultrasonic Symposium-941.

Information Page by W.L. Gore & Associates, Inc., Microminiature Flat Cable, www.goreelectronics.com, 1 page.

Information Page by W.L. Gore & Associates, Inc., IMAGIN Medical Probe Cables, www.goreelectronics.com, 2 pages.

Information Page by W.L. Gore & Associates, Inc., MICROFLAT Ribbon Cable, www.goreelectronics.com, 2 pages.

* cited by examiner

ULTRASOUND PROBE

FIELD OF THE INVENTION

The present invention relates to ultrasound probes, and more particularly, to an improved ultrasound probe that provides a simplified, low mass and reliable fixed connection between an ultrasound transducer array and signal cable that are interconnectable to an imaging system.

BACKGROUND OF THE INVENTION

Known ultrasound imaging probe arrangements typically include a multi-conductor signal cable, one end of which is connected to an imaging system (e.g. comprising a signal processor and display monitor), and the other end of which is indirectly connected to an ultrasound transducer array. In response to an imaging system drive signal the ultrasound transducer array transmits acoustic waves into and receives echo pulses from a region of interest (ROI) to yield an image signal. In turn, the image signal is utilized by the imaging system to form an image of the ROI.

In some approaches, the indirect interconnection between the signal cable and ultrasound transducer array is established by a transitional device, e.g. a flexible printed circuit or printed circuit board). See e.g. U.S. Pat. No. 6,100,626. Such transitional devices not only add expense and complexity, but also limit the maneuverability and reliability of the ultrasound probes.

SUMMARY OF THE INVENTION

A primary objective of the present invention is to provide an ultrasound probe having reduced componentry.

A related objective of the present invention is to provide an ultrasound probe with reduced complexity.

A further related objective of the present invention is to provide an ultrasound probe with reduced assembly requirements.

Yet another related objective of the present invention is to provide an ultrasound probe having reduced material and production costs.

Additional broad objectives of the present invention are to provide an ultrasound probe having reduced bulk, and enhanced maneuverability and reliability.

One or more of the above objectives and additional advantages are realized by the ultrasound probe comprising the present invention. The inventive ultrasound probe includes a support member, a signal cable comprising a plurality of electrically conductive members (e.g. conductive wires), and an ultrasound transducer array supportably interconnected to a first side of the support member, wherein the ultrasound transducer array comprises a plurality of transducer elements electrically and fixedly interconnected to different ones of the electrically conductive members at the first side of the support member. As will become apparent, the inventive ultrasound probe may facilitate or otherwise provide a direct electrical connection between the electrically conductive members and transducer elements thereof.

In one aspect of the invention, distal end portions of the plurality of electrically conductive members are separately and at least partially embedded within and extend through the support member to the first side thereof along spaced-apart paths. To enhance compactness, the electrically conductive members may be positioned to follow substantially parallel paths through the support member. For example, the electrically conductive members may enter the support member on a second side that opposes the first side and follow substantially parallel and linear paths therebetween.

To facilitate embedded positioning of the electrically conductive members, a plurality of openings, or channels, may be defined in the support member. Such openings may be sized to engageably (e.g. conformally) receive the electrically conductive members therethrough. In one approach, the openings may be defined (e.g. via laser drilling) to extend from the first side to a second side that opposes the first side. In another approach, a separate channel for each of the electrically conductive members may extend into the support member (e.g. a plurality of parallel, cut grooves) from a third side thereof (e.g. the third side being orthogonal to the first and second sides). In yet another arrangement, to facilitate production, the support member may comprise first and second support members that are adjoined (e.g. bonded) with the plurality of electrically conductive members captured therebetween. In such arrangement, one or both of the first and second support members may be provided with channels (e.g. cut-out grooves) along the adjoining surface (s).

In another aspect of the invention, the support member may advantageously comprise at least one acoustic dampening material for dampening incident acoustic waves, and thereby isolate the ultrasound transducer array for enhanced imaging. More particularly, the acoustic dampening material absorbs acoustic waves traveling in the rearward direction, thereby reducing undesired artifacts in image signals provided by the ultrasound transducer array. The acoustic dampening material may be selected to have an acoustic dampening index, or attenuation factor, of at least 1 dB/cm MHz, and more preferably at least 5 dB/cm MHz. By way of particular example, for medical imaging applications the acoustic dampening material may preferably have an acoustic dampening index of at least 15 dB/cm MHz. For enhanced dampening, the acoustic dampening material may be provided to surround, and thereby completely embed the distal end portions of the electrically conductive members along the length thereof.

The first side of the support member may comprise a plurality of separated portions, wherein different ones of the electrically conductive members extend entirely through each of the separated portions. In one approach, the first side of the support member may be diced to define the separated portions. As may be appreciated, the above-noted plurality of transducer elements may be supportably interconnected to different ones of the separated portions of the support member.

In this regard, and in one embodiment of the present invention, the ultrasound transducer array may be defined by a piezoelectric layer. By way of example, the piezoelectric layer may comprise a ceramic-based material. Optionally, the ultrasound transducer array may be further defined by at least one electrically conductive signal layer interconnected to and between a first side of the piezoelectric layer and the first side of the support member. Further, an electrically conductive ground layer may be interconnected to a second side of the piezoelectric layer in opposing relation to said first side of the support member. Such ground layer may be selected to further provide a degree of acoustic impedance matching (i.e. between the piezoelectric layer and the region of interest (ROI) to be imaged in a given application). In this regard, one or more additional acoustic matching layers may be interconnected to the ground layer (e.g. on the side facing the ROI), wherein for a given application the acoustic impedance of the piezoelectric layer may be even better matched to the acoustic impedance of the ROI to be imaged.

The piezoelectric layer and electrically conductive layer (s) interconnected thereto may each comprise an aligned, common plurality of separated portions that define a one-dimensional array, (e.g. a single row or column) or two-dimensional array (e.g. multiple rows and columns) of the transducer elements. In one approach, the piezoelectric layer and optional electrically conductive signal layer(s) may be contemporaneously diced to define the plurality of separated portions. In another approach, the piezoelectric layer, first electrically conductive ground layer, optional acoustic matching layers, and the optional electrically conductive signal layer(s) may be contemporaneously diced to define the plurality of separated portions. In either case, the dicing operation may be completed in tandem with dicing of the first side of the support member.

As may be appreciated, the distal ends of the electrically conductive members, together with the optional, separated portions of the electrically conductive signal layer(s), define signal electrodes of each of the transducer elements. In turn, the electrically conductive ground layer may define either a common ground member or, if provided in separated portions, separate ground members of the plurality of transducer elements. Further in this regard, the electrically conductive ground layer may be electrically interconnected to a separate ground cable or to an electrically conductive ground member that further comprises the signal cable.

Of note, a primary portion of each of the electrically conductive members comprising the signal cable may extend proximally from the support member and be fixedly interconnected to a coupler of the signal cable at a proximal end thereof, wherein the primary portions of the electrically conductive members comprise at least a majority of the total continuous length of the electrically conductive members from a proximal end to a distal end of the signal cable. Additionally, the signal cable may be of a flexible construction. In this regard, the ultrasound probe may be continuously flexible from the support member to the proximal end of the signal cable.

In one approach, the electrically conductive members of the signal cable are separately interconnected in coincidental orientations to a non-conductive carrier. As noted, a coupler may be fixedly interconnected at the proximal end of the signal cable for selective interconnection and disconnection of the ultrasound probe to an ultrasound system, (e.g. either directly or via selective interconnection with a compatible coupler comprising one or more additional signal cable(s)). As may be appreciated, such coupler(s) may comprise separate electrically conductive members for each of the plurality of electrically conductive members.

In yet a further aspect of the present invention, a plurality of signal cables may be utilized in the inventive ultrasound probe, wherein distal ends of the plurality of electrically conductive members comprising each of the signal cables are separately embedded in and extend through one or an adjoined plurality of support member(s). For example, a plurality of signal cables may be positioned in a side-by-side arrangement and interconnected to an extended one-dimensional ultrasound transducer array. In another embodiment, the distal ends of a plurality of signal cables may be disposed in a stacked arrangement and interconnected to a two-dimensional ultrasound transducer array. In this embodiment, the support member may comprise a plurality of members, wherein the distal end portions of the electrically conductive members comprising each signal cable are captured between different pairs of said members. Such one-dimensional and two-dimensional arrangements may employ the various other features noted above.

Numerous additional features and attendant advantages of the present invention will be apparent to those skilled in the art upon consideration of the further description that follows.

DETAILED DESCRIPTION OF THE INVENTION

Figure 1:
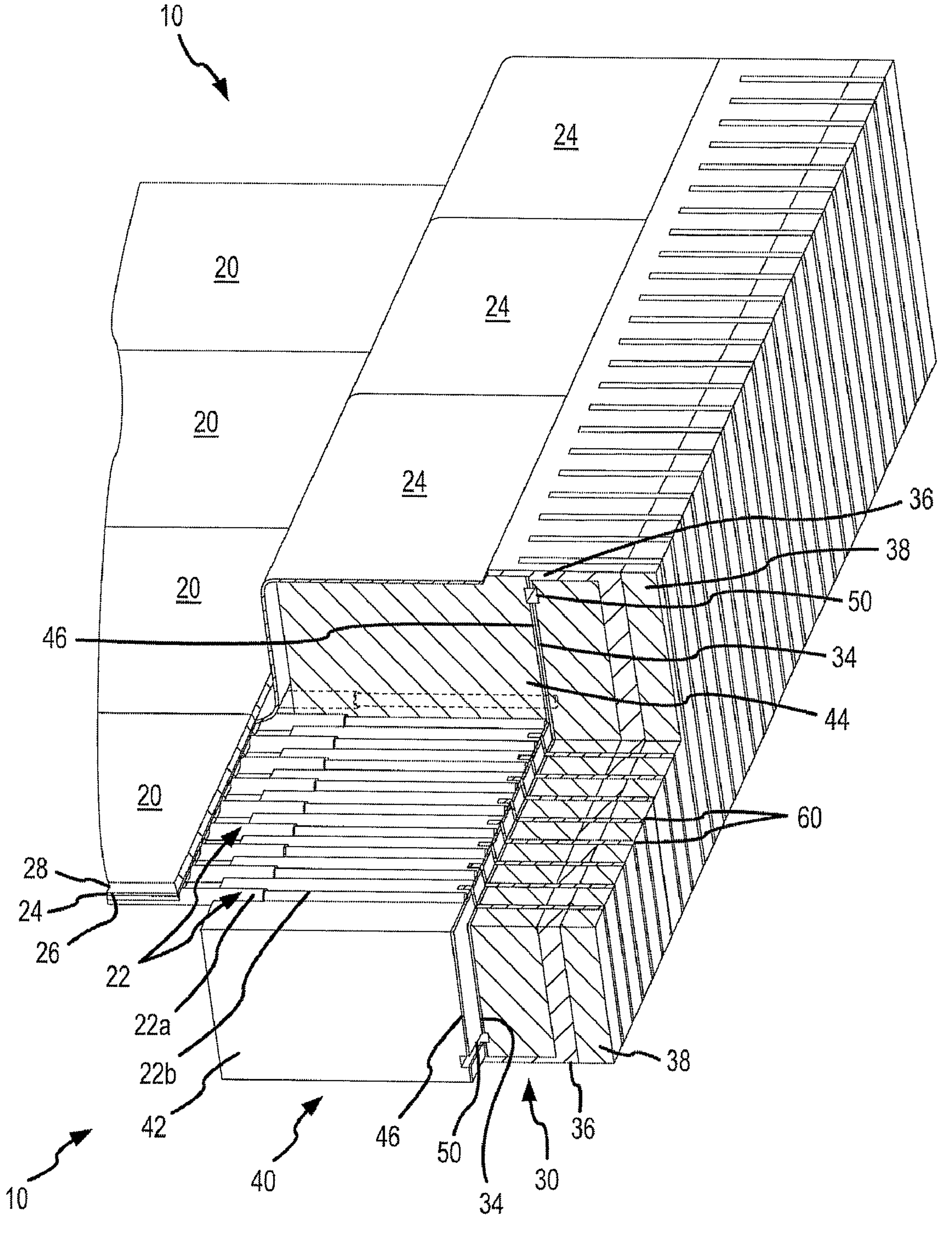
FIG. 1 is a perspective, partial cutaway view of one embodiment of an ultrasound probe comprising the present invention.

FIG. 1 illustrates one embodiment of an ultrasound probe 10 comprising a plurality of signal cables 20 whose distal ends are electrically and fixedly interconnected in a side-by side arrangement to a one-dimensional ultrasound transducer array 30. The distal ends of the signal cables 20 and ultrasound transducer array 30 are oriented to define a "forward-looking" arrangement. In this regard, the ultrasound probe 10 further includes a support member 40 for supportably receiving the distal ends of a plurality of signal lines 22 comprising each of the signal cables 20 and for supporting the ultrasound transducer array 30 on a forward-facing side thereof.

More particularly, and as shown in FIG. 1, distal end portions of each of the signal lines 22 may be separately embedded within and continuously extend into and through the support member 40 from a rearward-facing side to the forward-facing side thereof. To accommodate signal lines 22, a plurality of openings may be defined through the support member 40 in corresponding spaced relation to the spacing between, or pitch of, the signal lines 22 of signal cables 20. The signal lines 22 may each include an outer insulating layer 22*a* that has been removed from an embedded distal end portion of an electrically conductive wire 22*b*.

In one arrangement, the support member 40 may be defined by adjoined (e.g. bonded) portions of first and second support members 42 and 44, respectively, that capture the distal ends of signal lines 22 therebetween. The first support member 42 and/or second support member 44 may be provided with parallel channels (e.g. cut-out grooves) for receiving signal lines 22 therethrough.

In this regard, the support member 40 may advantageously comprise a molded, acoustic dampening material. The acoustic dampening material may be selected to provide a predetermined degree of acoustic dampening tailored for the particular intended application of ultrasound probe 10. By way of example, the support member 40 may comprise an epoxy-based dampening material having an acoustic dampening index, or attenuation factor, of at least 1 dB/cm MHz, and more preferably at least 5 dB/cm MHz. Further, the support member 40 may comprise two or more adjoined layers, e.g. a rearward layer comprising a first epoxy-based material (e.g. a composite comprising a relatively soft polymer embedded in a relatively hard matrix) that is relatively rigid and has a relatively high acoustic dampening index (e.g. at least 40 dB/cm MHz), and a forward layer bonded to the rearward layer and comprising a second epoxy-based material (e.g. a pure two-part epoxy resin) that has a lower acoustic dampening capability but enhanced bonding capabilities.

The ultrasound transducer array 30 may comprise a piezoelectric layer 32 interconnected (e.g. bonded) to support member 40. In one arrangement, the piezoelectric layer 32 may comprise a ceramic-based material such as PZT (i.e. lead zirconate titanate). Optionally, an electrically conductive signal layer 46 may be interconnected (e.g. bonded) to a forward-facing side of support member 40. In one arrangement, conductive signal layer 46 may be defined by gold-plating. Further, an electrically conductive signal layer 34 may be optionally disposed (e.g. sputter deposited) on a rearward-facing side of piezoelectric layer 32 and interconnected (e.g. bonded) to a forward facing side of support member 40 or conductive signal layer 46 if provided.

An electrically conductive ground layer 36 may also be interconnected (e.g. bonded) to a forward-facing side of the piezoelectric layer 32. In addition to being electrically conductive, ground layer 36 may be selected to yield a degree of acoustic impedance matching between the piezoelectric layer 32 and an imaging region of interest (ROI) for a given application. By way of example, conductive ground layer 36 may comprise an epoxy-based material having metal particles mixed therewith. In other arrangements, ground layer 36 may be defined by a metal foil, metal mesh or metallized plastic substrate. Optionally, a further acoustic matching layer 38 may be interconnected (e.g. bonded) to a forward-facing surface of the ground layer 36. By way of example, matching layer 38 may comprise an electrically nonconductive material selected to yield an additional degree of acoustic impedance matching between the piezoelectric layer 32 and the ROI for a given application. For example, in a typical medical application, a tissue ROI may have an acoustic impedance of about 1.5 MRayl, and the piezoelectric layer 32, ground layer 36 and matching layer 38 may be provided to have acoustic impedances of about 20–30 MRayl, 5–15 MRayl and 2–5 MRayl.

As shown, electrically conductive ground layer 36 and piezoelectric layer 32, as well as the optional layers 38, 34 and 46 if provided, may each comprise an aligned, common plurality of separated portions that define a one-dimensional array or row, of transducer elements of ultrasound transducer array 30. Correspondingly, a shallow-depth of the forward-facing side of support member 40, may comprise a corresponding, aligned plurality of same-sized, separated portions. The various separated portions noted above may be separately or contemporaneously defined. For example, in one approach, the ultrasound transducer array 30, forward-facing side of support member 40, and various electrically conductive layers interconnected thereto may be cut, or diced, contemporaneously. In turn, an electrically non-conductive material 60 (e.g. a room-temperature-vulcanizing (RTV) rubber) may be provided (e.g. via vacuum impregnation) into the cut-out regions to electrically isolate and physically adjoin the separated portions.

As illustrated, different ones of the electrically conductive wires 22*b* extend through each of the separated portions at the forward-facing side of support member 40 to directly contact the ultrasound transducer array 30. The distal ends of wires 22*b*, together with the separated portions of conductive signal layer 46 and/or conductive signal layer 34 if provided, define signal electrodes for the transducers elements comprising the ultrasound transducer array 30. Preferably, the combined thickness of conductive signal layer 46 and conductive signal layer 34 is between about 1,000 angstroms and, 20,000 angstroms. Further, the separated portions of conductive ground layer 36 defines ground electrodes for the transducer elements comprising the ultrasound transducer array 30. Preferably the thickness of conductive ground layer 36 is between about 0.2 λ (wavelength) and 0.3 λ (wavelength).

Further in this regard, the electrically conductive ground layer 36 is electrically connected to an electrically conductive layer 24 of each of the signal cables 20. More particularly, the electrically conductive layer 24 may be of a flexible construction (e.g. a copper foil) and readily wrapped around a portion of support member 40 to physically contact a portion of the electrically conductive ground layer 36 that extends around the top and/or bottom surfaces of piezoelectric layer 32 and a portion of support member 40. In one example, electrically conductive ground layer 36 may be interconnected to piezoelectric layer 32 and support member 40. Certainly, numerous other approaches may be utilized to establish electrical contact between the electrically conductive ground layer 36 and electrically conductive layers 24 of signal cables 20.

To isolate the optional electrically conductive signal layers 46 and 34 from the electrically conductive ground layer 36, isolation channels 50 that extend across the width of either or both of the support member 40 and piezoelectric layer 32 may be provided. As shown, the isolation channels 50 may be combinatively defined by aligned channels (e.g. cut-out grooves) that extend across the width of both the support member 40 and piezoelectric layer 32, and that are of a depth that exceeds the thickness of optional conductive signal layers 42 and 34, respectively.

As may be appreciated, the ultrasound probe 10 shown in FIG. 1 is of a maneuverable, relatively simple and reliable construction. In this regard, a product marketed under the name MICROFLAT by W.L. Gore & Associates, Inc. may be readily utilized for signal cables 20. As shown, each MICROFLAT signal cable 20 includes signal lines 22 physically interconnected to a carrier defined by first and second base layers 26 and 28 (e.g. comprising polyimide), with the above-noted flexible, electrically conductive layer 24 disposed therebetween.

Figure 2:
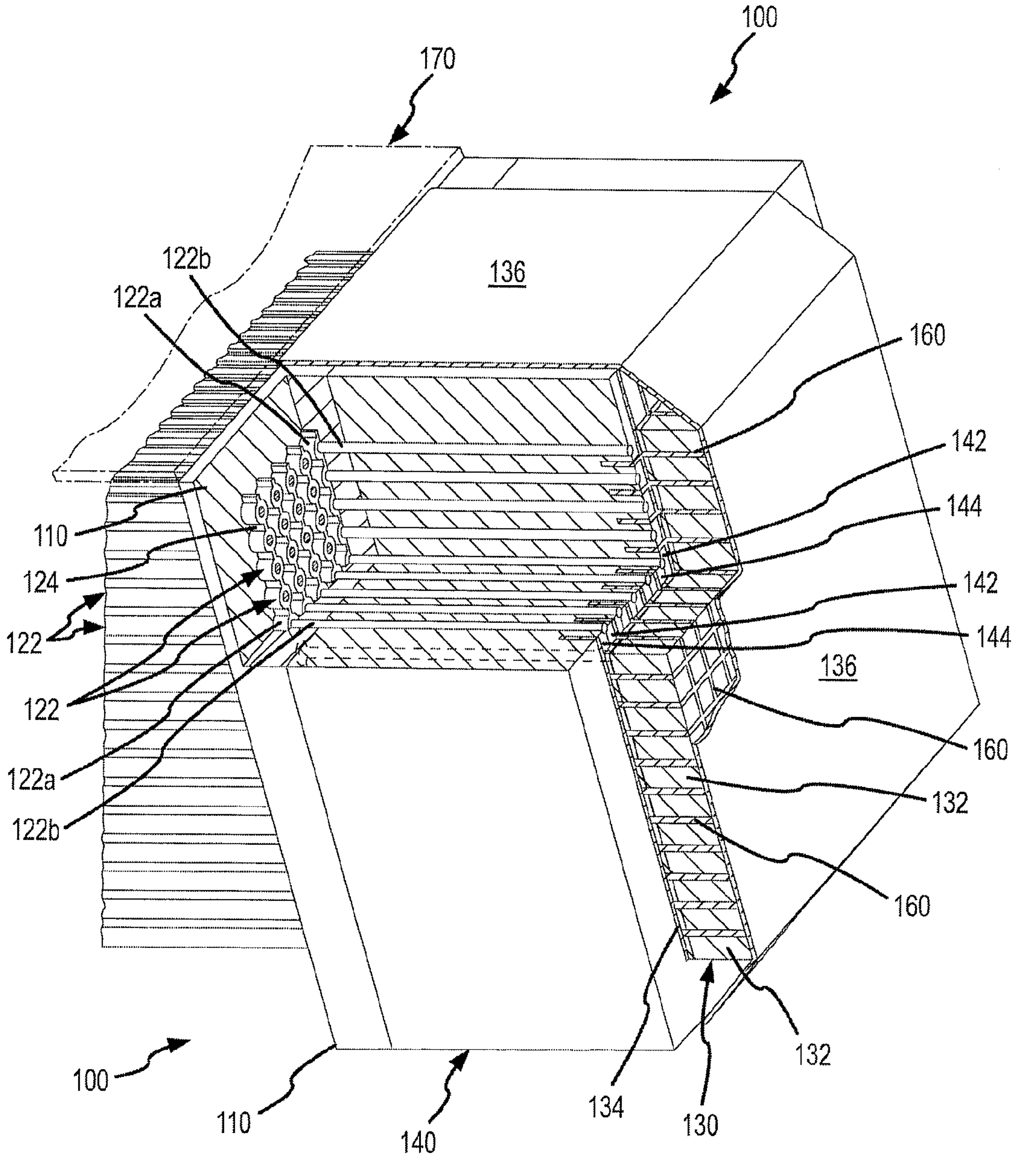
FIG. 2 is a perspective, partial cutaway view of another embodiment of an ultrasound probe comprising the present invention.

FIG. 2 illustrates another embodiment of an ultrasound probe 100 comprising a plurality of signal cables 120 whose distal ends are electrically and fixedly interconnected in a stacked arrangement to a two-dimensional ultrasound transducer array 130. Again, the distal ends of the plurality of signal cables 120 and ultrasound transducer array 130 are oriented to define a "forward-looking" arrangement. In this regard, the ultrasound probe 100 further includes a support member 140 for supportably receiving the distal ends of a plurality of signal lines 122 comprising each of the signal cables 120 and for supporting the ultrasound transducer array 130 on a forward-facing side thereof. In this embodiment, a strain-relief member 110 may be interconnected (e.g. bonded) about the plurality of signal cables 120 and to a rearward-facing side of support member 140. By way of example, strain-relief member 110 may comprise a resilient material (e.g. a polymer-based material).

Distal end portions of each of the signal lines 122 may be separately embedded within and, as shown in FIG. 2, may continuously extend into and through the support member 140 from a rearward facing side to the forward-facing side thereof. The signal lines 122 may each include an outer insulating layer 122*a* that has been removed from an embedded distal end portion of an electrically conductive wire 122*b*.

As illustrated, the support member 140 may be defined by a plurality of adjoined (e.g. epoxy bonded) sets of first and second support members 142 and 144, respectively, wherein each given set receives the signal lines 122 of a corresponding different one of said plurality of signal cables 120 therebetween. The first and/or second support members 142 and 144 of each set may be provided with parallel channels (e.g. cut-out) for receiving signal lines 122 therethrough. Such channels may be provided in corresponding spaced relation to the spacing between, or pitch of, the signal lines 122 of each given signal cable 120. In another arrangement, the support member 140 may be defined by a plurality of adjoined, commonly-shaped support members, wherein the signal lines 122 of a different one of the plurality of signal cables 120 are located between a different adjoining pair of support members. In such arrangement, parallel channels may be provided on one or both sides of each support member in corresponding spaced relation to the pitch of the signal lines 122 of each given cable 120.

Again, the support member 140 may comprise a molded acoustic dampening material. As with ultrasound probe 10, the acoustic dampening material may be selected to provide a predetermined degree of acoustic dampening for the intended application. Further, the support member 140 of ultrasound probe 110 may comprise a plurality of layers comprising different acoustic dampening materials.

The ultrasound transducer array 130 may comprise a piezoelectric layer 132 interconnected (e.g. bonded) to support member 140. In one arrangement, the piezoelectric layer 132 may comprise a ceramic-based material (e.g. PZT). An optional electrically conductive signal layer (not shown) may be interconnected to a forward-facing side of the support member 140 (e.g. a gold-plated layer). Further, an optional electrically conductive signal layer 134 may be interconnected (e.g. sputter deposited) to a rearward-facing side of piezoelectric layer 132 and interconnected (e.g. bonded) to a forward-facing side of support member 140 or an electrically conductive signal layer if provided thereupon.

An electrically conductive-backed sheet 136 may be interconnected (e.g. via epoxy bonding) to a forward-facing side of the piezoelectric layer 132. By way of example, the conductive-backed sheet 136 may comprise a plastic substrate (e.g. mylar) with an electrically-conductive ground layer of metalization provided on the side of the plastic substrate that faces piezoelectric layer 132. While not shown, a duel electrically conductive and acoustic impedance matching layer may be interposed between the conductive-backed sheet 136 and piezoelectric layer 132 in order to better match the acoustic impedance of the piezoelectric layer 132 to the imaging ROI of a given application.

The piezoelectric layer 132, as well as the optional electrically signal conductive signal layer 134 may each comprise an aligned, common plurality of separated portions that define a two-dimensional array of transducer elements of ultrasound transducer array 130. Correspondingly, a shallow-depth of a forward-facing side of the support member 140 may comprise a corresponding, aligned plurality of same-sized, separated portions. Again, the various separated portions may be separately or contemporaneously defined, e.g. the piezoelectric layer 132, optional conductive signal layer 134, and the forward facing side of support member 140 and optional conductive signal layer thereupon, may be cut or diced contemporaneously. In turn, an electrically non-conductive material 160 (e.g. RTV rubber) may be provided (e.g. via vacuum impregnation) into the cut-out regions between the separated portions so as to electrically isolate and physically adjoin the separated portions.

As shown, different ones of the electrically conductive wires 122*b* extend through each of the separated portions at the forward-facing side of the support member 140 to directly contact array 130. The distal ends of wires 122*b*, together with the separated portions of the optional conductive signal layer 134 and optional conductive signal layer on support member 140, define signal electrodes of the transducer elements comprising the ultrasound transducer array 130. In this embodiment, the electrically conductive-backed sheet 136 defines a common ground electrode member for all of the transducer elements comprising the ultrasound transducer array 130.

Further, in this regard, the electrically conductive-backed sheet 136 may be electrically connected to a ground conductor comprising a separate cable 170 (shown in phantom lines). For isolation purposes, isolation channels may be provided (not shown). The cable member 170 may be of flexible construction and interconnected (e.g. bonded or soldered) to rear-facing side of support member 140. In turn, the cable ground member 170 runs the entire length of signal cables 120.

Again, the ultrasound probe 10 shown in FIG. 2 is of a maneuverable, relatively simple and reliable construction. In this regard, a product marketed under the name IMAGIN by W.L. Gore & Associates, Inc. may be readily utilized for each of the signal cables 120. As illustrated, the IMAGIN signal cables 120 each include signal lines 122 physically interconnected by a webbing 124 (e.g. comprising a Teflon-based polymer). As may be appreciated, the webbing 124 and insulation layers 122*a* of signal lines 122 may be integrally defined by a common material.

Figure 3:
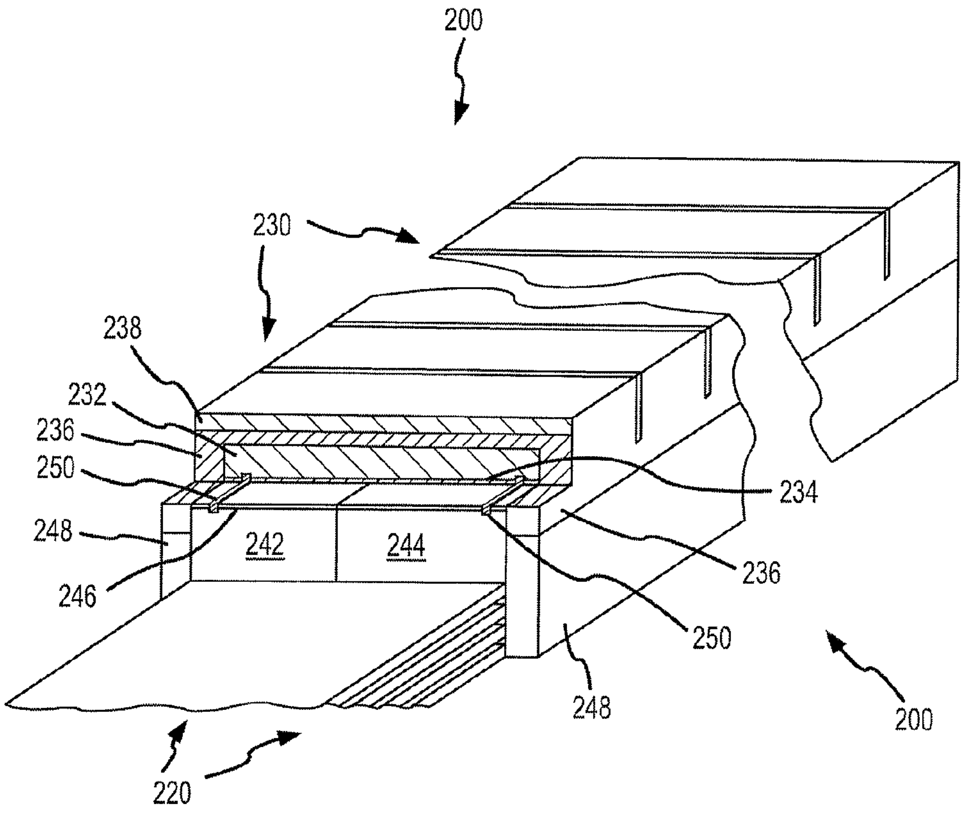
FIG. 3 is a perspective, partial cutaway view of an additional ultrasound probe embodiment comprising the present invention.
Figure 4:
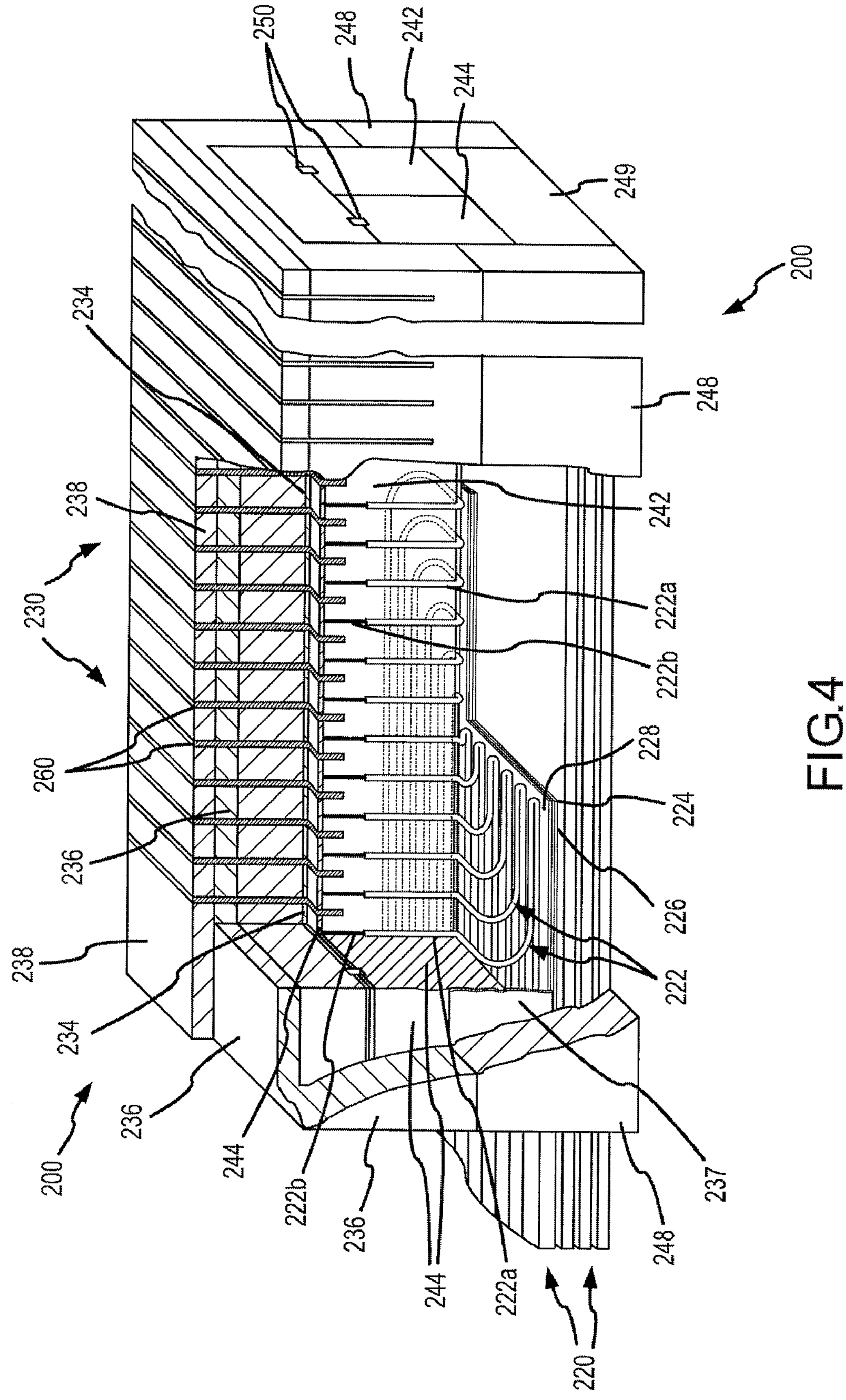
FIG. 4 is another perspective, partial cutaway view of the ultrasound probe embodiment shown in FIG. 3.

FIGS. 3 and 4 illustrate an additional embodiment of an ultrasound probe 200 that is quite similar to the ultrasound probe 10 illustrated in FIG. 1. The ultrasound probe 200 comprises a plurality of signal cables 220 whose distal ends are connected in an offset, stacked fashion to a one-dimensional ultrasound transducer array 230 to define a "side-looking" arrangement. In this regard, the ultrasound probe 200 includes a support member 240 for supportably receiving the distal ends of a plurality of signal lines 222 comprising each of the signal cables 220 and for supporting the ultrasound transducer array 230 on a top side thereof.

The distal end portions of signal lines 222 may be embedded within and, as shown in FIG. 4, may continuously extend into and through the support member 240. Again, a plurality of openings may be defined through the support member 240 in corresponding spaced relation to the spacing between, or pitch of, the signal lines 222 of signal cables 220. The signal lines 222 may each include an outer insulating layer 222*a* that has been removed from an embedded distal end portion of an electrically conductive wire 222*b*. Again, the support member 240 may be defined by adjoined first and second support members 242 and 244 respectively, and the first support member 242 and/or second support member 244 may be provided with parallel channels (e.g. cut-out) for receiving the distal ends of signal lines 222 therethrough. As shown, portions of signal cables 220 adjacent to the distal end portions thereof may be twisted 90° and bent, or folded, to an orthogonal orientation relative to the distal end portions. In order to maintain such positioning, outer support members 248 may be interconnected to support member 240 and an epoxy-based material 249 may be disposed between the outer support members 248 and in bonded engagement with the signal cables 220.

Again, the support member 240 may comprise a molded acoustic dampening material. As with ultrasound probe 10, the acoustic dampening material may be selected to provide a predetermined degree of acoustic dampening for the intended application. Further, the support member 240 may comprise a plurality of layers comprising different dampening materials.

The ultrasound transducer array 230 may comprise a piezoelectric layer 232 interconnected (e.g. bonded) to support member 240. In one arrangement, the piezoelectric layer 232 may comprise a ceramic-based material (e.g. PZT). Optionally, an electrically conductive signal layer 246 may be interconnected (e.g. sputter deposited) to a top side of support member 240. In one arrangement, conductive layer 246 may be defined by gold-plating. Further, an electrically conductive signal layer 234 maybe interconnected (e.g. bonded) to a bottom-facing side of piezoelectric layer 232 and top-facing side of support member 240 or conductive signal layer 242 if provided thereupon.

Electrically conductive ground layer 236 may also be interconnected (e.g. cast) to a top-facing side of piezoelectric layer 232. Again, this layer may also serve as an acoustic matching layer. Optionally, a further acoustic matching layer 238 may be interconnected (e.g. bonded) to a top-facing surface of conductive ground layer 236.

As shown, electrically conductive ground layer 236 and piezoelectric layer 232, as well as the optional layers 238, 234 and 246 if provided, may each comprise an aligned, common plurality of separated portions that define a one-dimensional array, or row, of transducer elements of ultrasound transducer array 230. Correspondingly, a shallow depth of the top-facing side of support member 240 may comprise a corresponding, aligned plurality of same-sized, separated portions. The various separated portions may be separately or contemporaneously defined. Again, in one approach the ultrasound transducer array 230, and top-facing side of support member 240 may be cut, or diced, contemporaneously. In turn, an electrically non-conductive material 260 (e.g. RTV rubber) may be provided (e.g. via vacuum impregnation) into the cut-out regions to electrically isolate and physically interconnect the separated portions.

As illustrated, different ones of the electrically conductive wires 222*b* extend through each of the separated portions at the top-facing side of support member 240 to directly contact array 230. The distal ends of wires 222*b*, together with the separated portions of conductive signal layer 246 and/or conductive signal layer 234 if provided, define signal electrodes of the transducer elements comprising the ultrasound transducer array 230. In turn, the separated portions of conductive ground layer 236 define ground connections of the transducer elements comprising ultrasound array 230.

In the later regard, the electrically conductive ground layer 236 is electrically connected to electrically conductive ground layers 224 of each of the signal cables 220. More particularly, conductive layer 236 is electrically interconnected to ground layers 224 via intermediate, electrically conductive members 237 (e.g. conductive foil fingers-only one shown) that extend from between base layers 226 or 228 of each of the signal cables 220 to contact the ground layer 236. In the embodiment shown in FIGS. 3 and 4, isolation channels 250 may be provided along the length of the probe 200 to isolate the conductive signal layers 246, 234 from the ground layer 236.

Ultrasound probe 200 may conveniently utilize the above-noted MICROFLAT product for signal cables 220. The utilization of such cable yields a maneuverable ultrasound probe 200 that may be readily fabricated.

Figure 5:
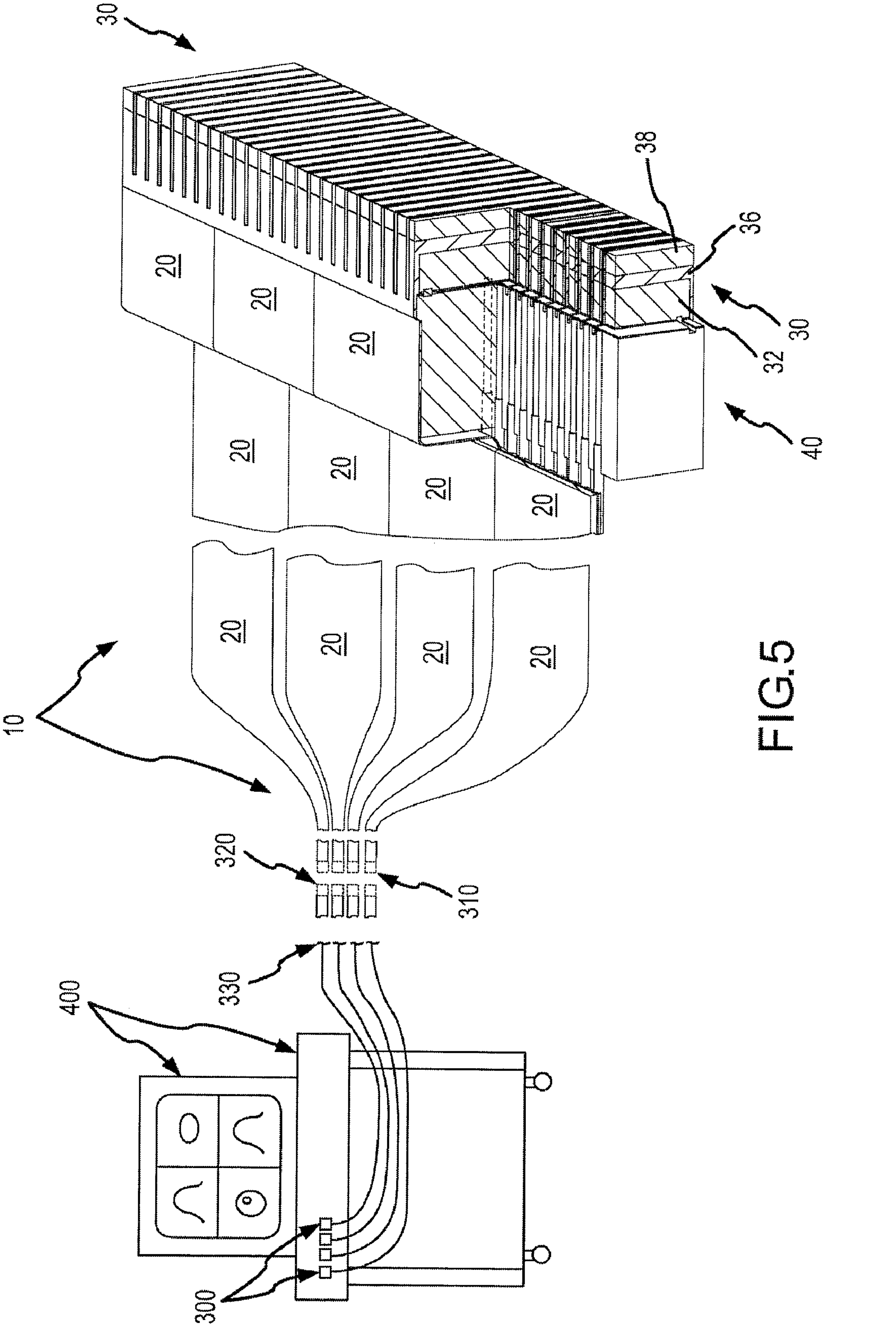
FIG. 5 illustrates the ultrasound probe embodiment of FIG. 1 interconnected to an exemplary imaging system.

More generally, each of the ultrasound probe embodiments 10, 200 and 300 is adapted for simplified interface with an imaging system. For example, and as shown in FIG. 5, the signal cables 20 of ultrasound signal probe 10 may each be fixedly provided with a proximal end coupler 300 for plug-in interface with an imaging system 400 (e.g. comprising a signal processor and display). Optionally, intermediate couplers 310 may be provided at the proximal ends of signal cables 20 for ready interface with intermediate couplers 320 provided at the ends of additional signal cables 330.

The above-described embodiments are not intended to limit the scope of the present invention as numerous modifications and extensions will be apparent to those skilled in the art. For example, Litz wire or coaxial cable lines may be utilized in place of signal cables 20, 120, 220. In the case of cable lines, an outer conductive sheathing of each cable line may be electrically interconnected via a common, conductive wire to a ground layer 36, 136, 236. Further, capacitive micromachined ultrasound transducers (MUTS), may be used in place of ultrasound transducer arrays 30, 130, 330.

Such modifications are merely exemplary of the range of equivalents that may be employed for the various features of the present invention as further defined by the claims which follow.

What is claimed is:

1. An ultrasound probe, comprising:

a support member comprising an acoustic dampening material;

a signal cable comprising a plurality of electrically conductive members extending continuously along the length of said signal cable, wherein a distal end portion of each of said plurality of electrically conductive members is separately embedded within and continuously extends into and through said support member to a first side thereof from a second side thereof, wherein a flexible primary portion of said signal cable extends proximally away from said second side of the support member and includes an electrically non-conductive material, and wherein said plurality of electrically conductive members are electrically separated in said flexible primary portion of the signal cable by said electrically non-conductive material; and, an ultrasound transducer array supportably mounted to said first side of said support member, said ultrasound transducer array including a plurality of transducer elements that are electrically, directly and fixedly interconnected to a distal end of corresponding different ones of said plurality of electrically conductive members at said first side of the support member, wherein each of said electrically conductive members of the signal cable extends continuously from a proximal end corresponding with the proximal end of said flexible primary portion of the signal cable, continuously into said second side of the support member, and continuously through said support member to said corresponding distal end at the first side of the support member.

2. An ultrasound probe as recited in claim 1, wherein the second side of the support member opposes the first side thereof.

3. An ultrasound probe as recited in claim 2, wherein said electrically conductive members follow substantially parallel paths through said support member.

4. An ultrasound probe as recited in claim 2, wherein said support member includes a plurality of openings, extending therethrough from said second side to said first side thereof, for separately receiving different ones of said plurality of electrically conductive members in one-to-one relation.

5. An ultrasound probe as recited in claim 4, wherein said support member comprises:

first and second members interconnected on adjoining sides thereof with said plurality of electrically conductive members captured and extending therebetween from said second side to said first side of the support member.

6. An ultrasound probe as recited in claim 5, wherein said plurality of openings are defined by channels on at least one said adjoining sides of said first and second members.

7. An ultrasound probe, comprising:

a support member, wherein said support member comprises adjoined first and second portions comprising different first and second acoustic dampening materials, respectively;

a signal cable comprising a plurality of electrically conductive members extending continuously along the length of said signal cable, wherein a distal end portion of each of said plurality of electrically conductive members is separately embedded within and continuously extends into and through said support member to a first side thereof from a second side thereof, wherein a flexible primary portion of said signal cable extends proximally away from said second side of the support member and includes an electrically non-conductive material, and wherein said plurality of electrically conductive members are electrically separated in said flexible primary portion of the signal cable by said electrically non-conductive material; and, an ultrasound transducer array supportably mounted to said first side of said support member, said ultrasound transducer array including a plurality of transducer elements that are electrically, directly and fixedly interconnected to a distal end of corresponding different ones of said plurality of electrically conductive members at said first side of the support member, wherein each of said electrically conductive members of the signal cable extends continuously from a proximal end corresponding with the proximal end of said flexible primary portion of the signal cable, continuously into said second side of the support member, and continuously through said support member to said corresponding distal end at the first side of the support member.

8. An ultrasound probe as recited in claim 1, wherein said acoustic dampening material has an acoustic dampening index of at least about 1 dB/cm MHz.

9. An ultrasound probe as recited in claim 1, wherein said acoustic dampening material substantially surrounds the distal end portions of said plurality of electrically conductive members.

10. An ultrasound probe as recited in claim 1, wherein said support member comprises:

adjoined first and second portions comprising different first and second acoustic dampening materials, respectively.

11. An ultrasound probe as recited in claim 1, wherein said first side of said support member includes a plurality of separated portions, and wherein different ones of said plurality of electrically conductive members extend through different ones of said plurality of separated portions.

12. An ultrasound probe as recited in claim 11, wherein said plurality of transducer elements are supportably interconnected to different ones of said plurality of separated portions of said support member.

13. An ultrasound probe as recited in claim 12, wherein said plurality of transducer elements are defined by separated portions of a piezoelectric material.

14. An ultrasound probe as recited in claim 13, wherein said plurality of transducer elements are further defined by separated portions of at least one electrically conductive signal layer interconnected between a first side of said piezoelectric material and corresponding ones of said plurality of separated portions of said support member.

15. An ultrasound probe as recited in claim 13, wherein said plurality of transducer elements are further defined by an electrically conductive ground member interconnected to a second side of said piezoelectric material in opposing relation to said first side of said support member.

16. An ultrasound probe as recited in claim 15, wherein said electrically conductive ground member is electrically connected to a conductive ground member of said signal cable.

17. An ultrasound probe as recited in claim 15, further comprising:

an acoustic impedance matching layer interconnected to said electrically conductive ground member.

18. An ultrasound probe as recited in claim 1, wherein a primary portion of each of said plurality of electrically conductive members extends proximally from said support member, and wherein said primary portions of said plurality of electrically conductive members comprise at least a majority of the lengths of said plurality of electrically conductive members from a distal end to a proximal end of said signal cable.

19. An ultrasound probe as recited in claim 18, further comprising:

a coupler, fixedly disposed at said proximal end of said signal cable, for selective interconnection and disconnection of said ultrasound probe to an ultrasound imaging system.

20. An ultrasound probe as recited in claim 18, wherein said signal cable further comprises:

an electrically non-conductive and flexible carrier, wherein said plurality of electrically conductive members are separately interconnected in coincidental orientations to said carrier.

21. An ultrasound probe as recited in claim 20, wherein said signal cable further comprises:

an electrically conductive member interconnected to said flexible carrier.

22. An ultrasound probe, comprising:

a support member comprising an acoustic dampening material having an acoustic dampening index of at least about 1 db/cm MHz;

a signal cable comprising a plurality of electrically conductive wires extending continuously along the length of said signal cable, wherein a distal end portion of each of said plurality of electrically conductive wires is separately embedded within and continuously extends into and through said support member to a first side thereof from a second side thereof, wherein a flexible primary portion of said signal cable extends proximally away from said second side of the support member and includes an electrically non-conductive material, wherein said plurality of electrically conductive wires are electrically separated in said flexible primary portion of the signal cable by said electrically non-conductive material, and wherein the proximal end of each of said electrically conductive wires is fixedly interconnected to a coupler; and an ultrasound transducer array is supportably mounted to the first side of the support member, said ultrasound transducer array including a plurality of transducer elements that are electrically, directly and fixedly interconnected to a distal end of corresponding different ones of said plurality of electrically conductive wires at said first side of the support member, wherein each of said electrically conductive wires of the signal cable extends continuously from a proximal end corresponding with the proximal end of said flexible primary portion of the signal cable, continuously into said second side of the support member, and continuously through said support member to said corresponding distal end at the first side of the support member.

23. An ultrasound probe as recited in claim 22, wherein said plurality of electrically conductive wires follow substantially parallel paths through said support member.

24. An ultrasound probe as recited in claim 23, wherein said support member includes a plurality of openings, extending from said second side to said first side thereof, for conformally and separately receiving different ones of said plurality of electrically conductive wires in one-to-one relation.

25. An ultrasound probe as recited in claim 22, wherein said support member comprises:

first and second members interconnected on adjoining sides thereof with said plurality of electrically conductive wires captured and extending therebetween from said second side to said first side of the support member.

26. An ultrasound probe as recited in claim 22, where said support member substantially surrounds the distal end portions of said plurality of electrically conductive wires.

27. An ultrasound probe as recited in claim 22, further comprising:

a plurality of signal cables each comprising a plurality of electrically conductive wires extending along the length thereof, wherein a distal end portion of each of said plurality of electrically conductive wires comprising each of said plurality of signal cables is separately and at least partially embedded within and extends through said support member from said second side to said first side thereof, and wherein said ultrasound transducer array includes a further plurality of transducer elements electrically and fixedly interconnected to different ones of said plurality of electrically conductive wires of said plurality of signal cables at said first side of the support member.

28. An ultrasound probe as recited in claim 27, wherein said support member comprises:

first and second members interconnected on adjoining sides thereof with said plurality of electrically conductive wires of each of said plurality of signal cables captured and extending therebetween from said second side to said first side of the support member.

29. An ultrasound probe as recited in claim 27, wherein said support member comprises:

a plurality of support members interconnected in a stacked manner, wherein said plurality of electrically conductive wires of different ones of said plurality of signal cables are captured and extending between different adjacent pairs of said plurality of support members from said second side to said first side thereof.

30. An ultrasound probe, comprising:

a support member comprising an acoustic dampening material, wherein a first side of said support member includes a plurality of separated portions;

a signal cable comprising a plurality of electrically conductive members extending continuously along the length of said signal cable, wherein a distal end portion of each of said plurality of electrically conductive members is separately embedded within and continuously extends into and through said support member to said first side thereof from a second side thereof, wherein different ones of said plurality of electrically conductive members extend through different ones of said plurality of separated portions, wherein a flexible primary portion of said signal cable extends proximally away from said second side of the support member and includes an electrically non-conductive material, and wherein said plurality of electrically conductive members are electrically separated in said flexible primary portion of the signal cable by said electrically non-conductive material; and, an ultrasound transducer array supportably mounted to said first side of said support member, said ultrasound transducer array including a plurality of transducer elements that are electrically, directly and fixedly interconnected to a distal end of corresponding different ones of said plurality of electrically conductive members at said first side of the support member, wherein each of said electrically conductive members of the signal cable extends continuously from a proximal end corresponding with the proximal end of said flexible primary portion of the signal cable, continuously into said second side of the support member, and continuously through said support member to said corresponding distal end at the first side of the support member.

31. An ultrasound probe as recited in claim 30, wherein said plurality of transducer elements are supportably interconnected to different ones of said plurality of separated portions of said support member.

32. An ultrasound probe as recited in claim 31, wherein said plurality of transducer elements are defined by separated portions of a piezoelectric material.

33. An ultrasound probe as recited in claim 32, wherein said plurality of transducer elements are further defined by separated portions of at least one electrically conductive signal layer interconnected between a first side of said piezoelectric material and corresponding ones of said plurality of separated portions of said support member.

34. An ultrasound probe as recited in claim 32, wherein said plurality of transducer elements are further defined by an electrically conductive ground member interconnected to a second side of said piezoelectric material in opposing relation to said first side of said support member.

35. An ultrasound probe as recited in claim 34, wherein said electrically conductive ground member is electrically connected to a conductive ground member of said signal cable.

36. An ultrasound probe as recited in claim 34, further comprising:

an acoustic impedance matching layer interconnected to said electrically conductive ground member.

* * * * *